(12) United States Patent
Jackson et al.

(10) Patent No.: US 10,855,850 B2
(45) Date of Patent: Dec. 1, 2020

(54) DATA PROCESSING

(71) Applicant: Metaswitch Networks Ltd., Enfield (GB)

(72) Inventors: Daniel Ian Jackson, Enfield (GB); Matthew John Russell, Enfield (GB); Josephine Julie Adkin, Enfield (GB); Matthew Williams, Enfield (GB); Andrew Munro Caldwell, Enfield (GB); David Graeme Robertson, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 0 days.

(21) Appl. No.: 16/440,845

(22) Filed: Jun. 13, 2019

(65) Prior Publication Data

US 2019/0387105 A1    Dec. 19, 2019

(30) Foreign Application Priority Data

Jun. 15, 2018 (GB) .................................. 1809833.5

(51) Int. Cl.
*H04M 15/00* (2006.01)

(52) U.S. Cl.
CPC ........... *H04M 15/60* (2013.01); *H04M 15/41* (2013.01); *H04M 15/67* (2013.01)

(58) Field of Classification Search
CPC ...... H04M 15/60; H04M 15/67; H04M 15/41; H04M 15/53; H04M 15/8278; H04M 15/83; H04M 15/65; H04M 15/57; H04M 15/44; H04M 2215/208; H04M 2215/0172; H04M 2215/0164; H04M 2215/0104; H04L 12/1403; H04L 12/1482; H04L 12/1428;

(Continued)

(56) References Cited

U.S. PATENT DOCUMENTS

2006/0239427 A1    10/2006  Cooke et al.
2012/0030077 A1*   2/2012   Pei ........................ H04L 47/125
                                                    705/34

FOREIGN PATENT DOCUMENTS

EP    1354273 A1    10/2003
EP    1554867 A2     7/2005

(Continued)

OTHER PUBLICATIONS

3rd Generation Partnership Project, 3GPP TS 32.240, v15. I.O, Mar. 28, 2018, "Charging Management; Charging architecture and principles" (Release 15) XP051450643.

(Continued)

*Primary Examiner* — Anthony S Addy
*Assistant Examiner* — Farid Seyedvosoghi
(74) *Attorney, Agent, or Firm* — EIP US LLP

(57) ABSTRACT

Data is processed in a telecommunications network. First and second notifications are received, via an input interface, from first and second Charging Trigger Functions, CTFs, in the telecommunications network. The first and second notifications relate to network resource usage in the telecommunications network. A scalable transformation function is used to transform data derived from the first and second notifications into a first usage detail report in a first detail report format and a second usage detail report in a second, different detail report format. The first and second usage detail reports are output, via an output interface, to at least one recipient system.

20 Claims, 2 Drawing Sheets

(58) Field of Classification Search
CPC ...... H04L 69/08; H04L 65/1016; H04W 4/24;
G06Q 30/04
USPC ........................................................ 455/406
See application file for complete search history.

(56) References Cited

FOREIGN PATENT DOCUMENTS

| | | |
|---|---|---|
| EP | 1123606 B1 | 8/2007 |
| EP | 2083533 A1 | 7/2009 |
| EP | 2436146 A1 | 4/2012 |
| WO | 2017101443 A1 | 6/2017 |

OTHER PUBLICATIONS

"Project Clearwater, RF Billing, Sep. 27, 2015, Graeme RobertsonURL: http://www.proj ectclearwater.org/rf-billing/".
"Project Clearwater, Release 1.0, Jun. 4, 2018URL: https://media.readthedocs.org/pdf/ clearwater/latest/clearwater.pdf".
Combined Search and Examination Report dated Jul. 30, 2018 for UK Application No. GB1809833.5.
United Kingdom Combined Search and Examination report dated Jul. 16, 2019 for Application No. GB 1908548.9.

\* cited by examiner

DATA PROCESSING

CROSS-REFERENCE TO RELATED APPLICATIONS

This application claims priority to United Kingdom Application No. GB1809833.5, filed Jun. 15, 2018, under 35 U.S.C. § 119(a). The above-referenced patent application is incorporated by reference in its entirety.

BACKGROUND OF THE INVENTION

Technical Field

The present disclosure relates to data processing. In particular, but not exclusively, the present disclosure relates to methods of processing data, computer programs, network elements and telecommunications networks.

Background

A Charging Collection Function (CCF) is a network element in an Internet Protocol (IP) Multimedia Subsystem (IMS) deployment. A CCF handles offline charging. Other network elements comprising integrated Charging Trigger Functions (CTFs) can send notifications to the CCF, for example as Accounting Requests (ACRs) on a Diameter-based Rf interface. The Rf interface is a standardized interface for offline charging, which uses the Diameter protocol. Examples of such other network elements include, but are not limited to, Call State Control Functions (CSCFs), Access Gateway Control Functions (AGCFs), Media Gateway Controller Functions (MGCFs), Breakout Gateway Control Functions (BGCFs) and Application Servers (ASs). The CCF makes Charging Data Record (CDR) files available to downstream systems based on the received ACRs.

SUMMARY

According to first embodiments, there is provided a method of processing data in a telecommunications network, the method comprising: receiving, via an input interface, first and second notifications from first and second Charging Trigger Functions, CTFs, respectively in the telecommunications network, the first and second notifications relating to network resource usage in the telecommunications network; using a scalable transformation function to transform data derived from the first and second notifications into a first usage detail report in a first detail report format and a second usage detail report in a second, different detail report format; and outputting, via an output interface, the first and second usage detail reports to at least one recipient system.

According to second embodiments, there is provided a computer program arranged to perform a method according to the first embodiments.

According to third embodiments, there is provided a network element configured to perform a method according to the first embodiments.

According to fourth embodiments, there is provided a method of processing data in a telecommunications network, the method comprising: receiving, via an input interface, at least one notification from at least one network element of a plurality of different network elements, in the telecommunications network, the at least one notification relating to usage of network resources in the telecommunications network; transforming, using a scalable transformation function, data based on data comprised in the at least one notification into at least one usage detail report; and outputting, via an output interface, the at least one usage detail report to at least one recipient system of a plurality of different recipient systems, wherein the at least one network element comprises at least one charging trigger function, CTF, and wherein the method is performed by a charging collection function, CCF.

According to fifth embodiments, there is provided a computer program arranged to perform a method according to the third embodiments.

According to sixth embodiments, there is provided a network element configured to perform a method according to the fourth embodiments.

Further features will become apparent from the following description, given by way of example only, which is made with reference to the accompanying drawings.

DETAILED DESCRIPTION

Figure 1:
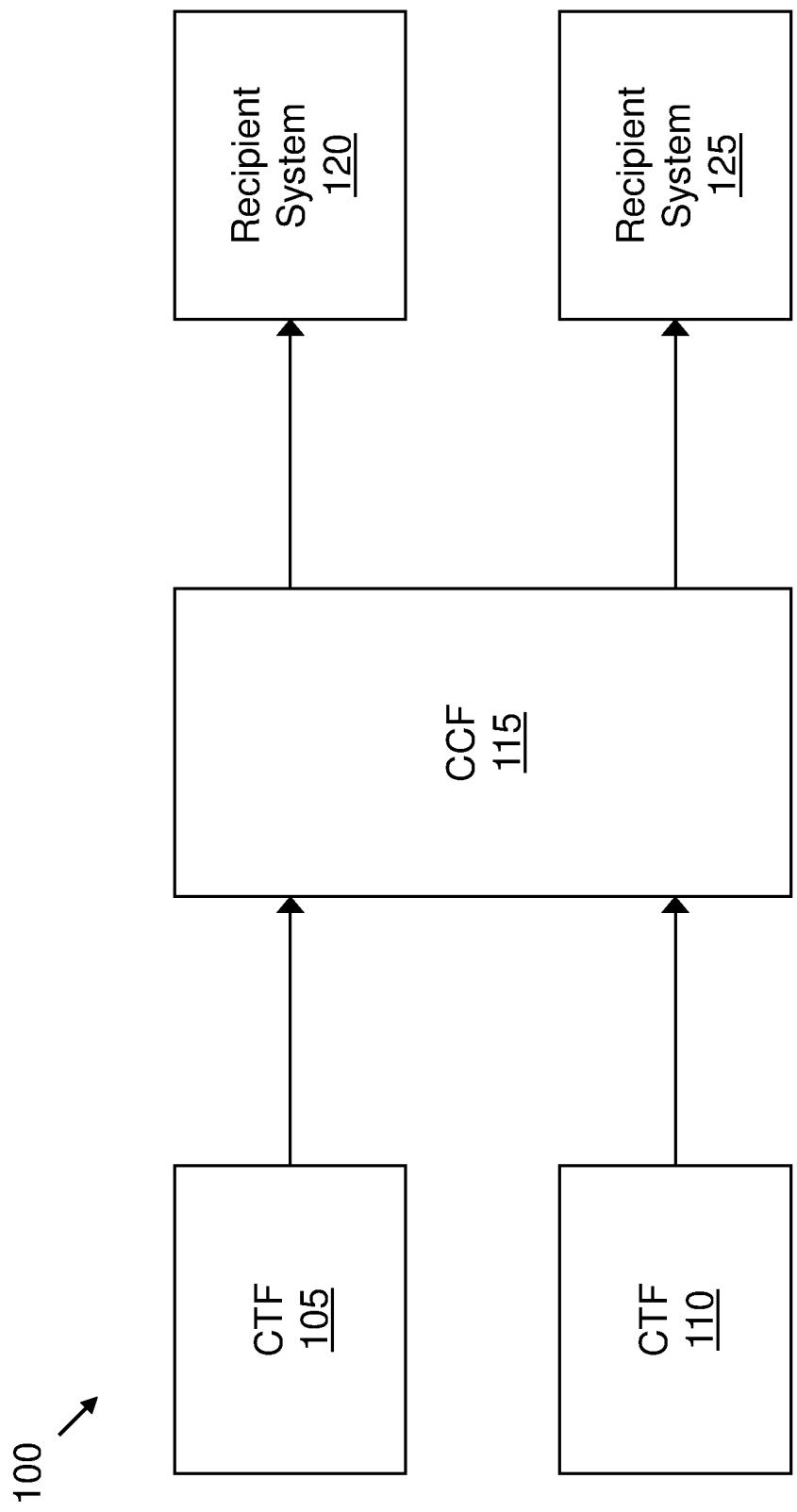
FIG. 1 shows a block diagram of an example of a telecommunications network in accordance with embodiments.

Referring to FIG. 1, there is shown schematically an example of a telecommunications network 100. The telecommunications network 100 provides telecommunications services to subscribers. For example, the subscribers may be able to use the telecommunications network 100 to make telephone calls. In this example, the telecommunications network 100 has an IMS architecture.

The telecommunications network 100 depicted in FIG. 1 comprises various network elements. The network elements depicted in FIG. 1 may be embodied as one or more physical resources, or as one or more virtualised resources instantiated on one or more physical resources. The network elements may comprise one or more processors and one or more memories. One or more computer programs comprising computer-readable instructions may be stored in the one or more memories. The one or more processors may be configured to execute the computer-readable instructions and perform at least some of the methods and techniques described herein as a result.

In this example, the telecommunications network 100 comprises first and second CTFs 105, 110, a CCF 115, and first and second recipient systems 120, 125. The telecommunications network 100 may comprise more or fewer network elements than those depicted in FIG. 1. For example, one or more than one CTF may be provided and one or more than one recipient system may be provided. In some examples, the number of CTFs is the same as the number of recipient systems. In some examples, the number of CTFs is different from the number of recipient systems. For example, multiple CTFs and a single recipient system may be provided or a single CTF and multiple recipient systems may be provided. However, as indicated above, in this specific example, the telecommunications network 100 comprises two CTFs, namely the first and second CTFs 105, 110, and two recipient systems, namely the first and second recipient systems 120, 125.

The first and second CTFs 105, 110 are communicatively coupled to the CCF 115 via respective interfaces. An example of such an interface is a Diameter-based Rf interface. An Rf interface is an example of standards-defined (also known as "standardized") interface. An Rf interface may be used to provide an IMS-compliant interface to the CCF 115. Another example of such an interface is a proprietary, eXtensible Markup Language (XML)-based interface that supports XML-format notifications. The XML-based interface may provide a richer source of information than an Rf interface. The first and second CTFs 105, 110 may be able to communicate with the CCF 115 using one or more than one such interface. For example, the first and/or second CTF 105, 110 may have an Rf interface only, an XML interface only, or both an Rf interface and XML interface. Having both interfaces to the CCF 115 may provide IMS-compliance with the possibility of richer information reporting. Although not depicted in FIG. 1, one or more further network elements may be provided between the first and second CTFs 105, 110 and the CCF 115. The one or more further network elements may, for example, provide load balancing functionality. As such, the CCF 115 may receive notifications, such as ACRs and/or XML notifications, directly or indirectly from the first and second CTFs 105, 110. The first and second CTFs 105, 110 may have at least one redundant connection to the CCF 115, via the one or more further network elements or otherwise.

The CCF 115 is also communicatively coupled to the first and second recipient systems 120, 125 via respective interfaces. One or both of the first and second recipient systems 120, 125 may comprise a subscriber charge generation system. A subscriber charge generation system may also be known as a billing system. The interface between the CCF 115 and a subscriber charge generation system may be a Bx interface, which uses the File Transfer Protocol (FTP). A Bx interface is an example of a standardized interface. However, another type of interface could be used. One or both of the first and second recipient systems 120, 125 may, however, comprise a system other than a subscriber charge generation system. Examples of such other systems, which will be described in more detail below, include, but are not limited to, audit systems, diagnostics systems, analytics systems, network performance systems, network availability systems, usage detail report analysis systems, lawful interception systems, and testing systems. A recipient system may, in some examples, provide multiple functions. For example, a recipient system may provide subscriber charge generation functionality and diagnostics functionality, diagnostics and analytics functionality etc.

In some examples, the telecommunications network 100 provides telecommunications services to first and second, different sets of subscribers. The first set of subscribers may be associated with the first recipient system 120 and the second set of subscribers may be associated with the second recipient system 125. For example, where the first and second recipient systems 120, 125 both comprise subscriber charge generation systems, the first set of subscribers may have an agreement with the first subscriber charge generation system 120 such that the first subscriber charge generation system 120 generates charges for the first set of subscribers, and the second set of subscribers may have an agreement with the second subscriber charge generation system 125 such that the second subscriber charge generation system 125 generates charges for the second set of subscribers. Such charges may be generated based on usage of resources in the telecommunications network 100. There may be overlap between subscribers in the first and second sets of subscribers.

In this example, the CCF 115 receives notifications from the first and second CTFs 105, 110, processes the notifications, and outputs usage detail reports, based on the processing of the received notifications, to the first and second recipient systems 120, 125. In more general examples, the CCF 115 receives at least one notification from at least one CTF, processes the at least one notification, and outputs at least one usage detail report based on the processing of the received at least one notification to at least one recipient system.

The first and second recipient systems 120, 125 may, however, wish to receive usage detail reports in a different manner to each other. For example, the first and second recipient systems 120, 125 may wish to receive usage detail reports in different formats and/or containing different information. Where, for example, the first and second recipient systems 120, 125 are both subscriber charge generation systems, the first and second subscriber charge generation systems 120, 125 may wish to receive CDR files from the CCF 115 in different output formats and/or containing different information. This may enable the first and second subscriber charge generation systems 120, 125 to provide reports to their respective subscribers in different formats. Where, for example, the first recipient system 120 is a subscriber charge generation system and the second recipient system 125 is a diagnostics system, the first recipient system 120 may wish to receive CDR files from the CCF 115 and the second recipient system 125 may wish to receive diagnostics reports from the CCF 115. In such an example, the CDR files may be formatted to be compatible with transmission over a Bx interface using FTP, whereas there may be more flexibility in how the diagnostics reports are formatted, for example, where the CCF 115 and the recipient system to which the diagnostics reports are sent are provided by the same vendor. Even where the CCF 115 is communicatively coupled to a single recipient system, the single recipient system may wish to receive different usage detail reports in different manners, for example containing different information and/or in different formats.

The CCF 115 described herein may enable the first and second recipient systems 120, 125 (and any other recipient systems to which the CCF 115 may output data) not to be required to be restricted or adapted such that they all use a single output format, corresponding to a single output format of the CCF 115. Such recipient systems may be legacy systems that are resource-intensive to change, and so modifying such recipient systems to have to use the same format as each other and as the CCF 115 could be highly resource-intensive or impractical for other reasons, particularly where the CCF 115 interfaces with many recipient systems. The customizable CCF 115 described herein provides a more practical solution. This consideration also applies where the CCF 115 is deployed to be used with a single recipient system. For example, where the customizable CCF 115 is deployed to work with a single, legacy recipient system, the customizable CCF 115 may be customized to be compatible with the format(s) used by the legacy recipient system, rather than requiring, for example, the legacy recipient system to be adapted to be compatible with the CCF 115.

Figure 2:
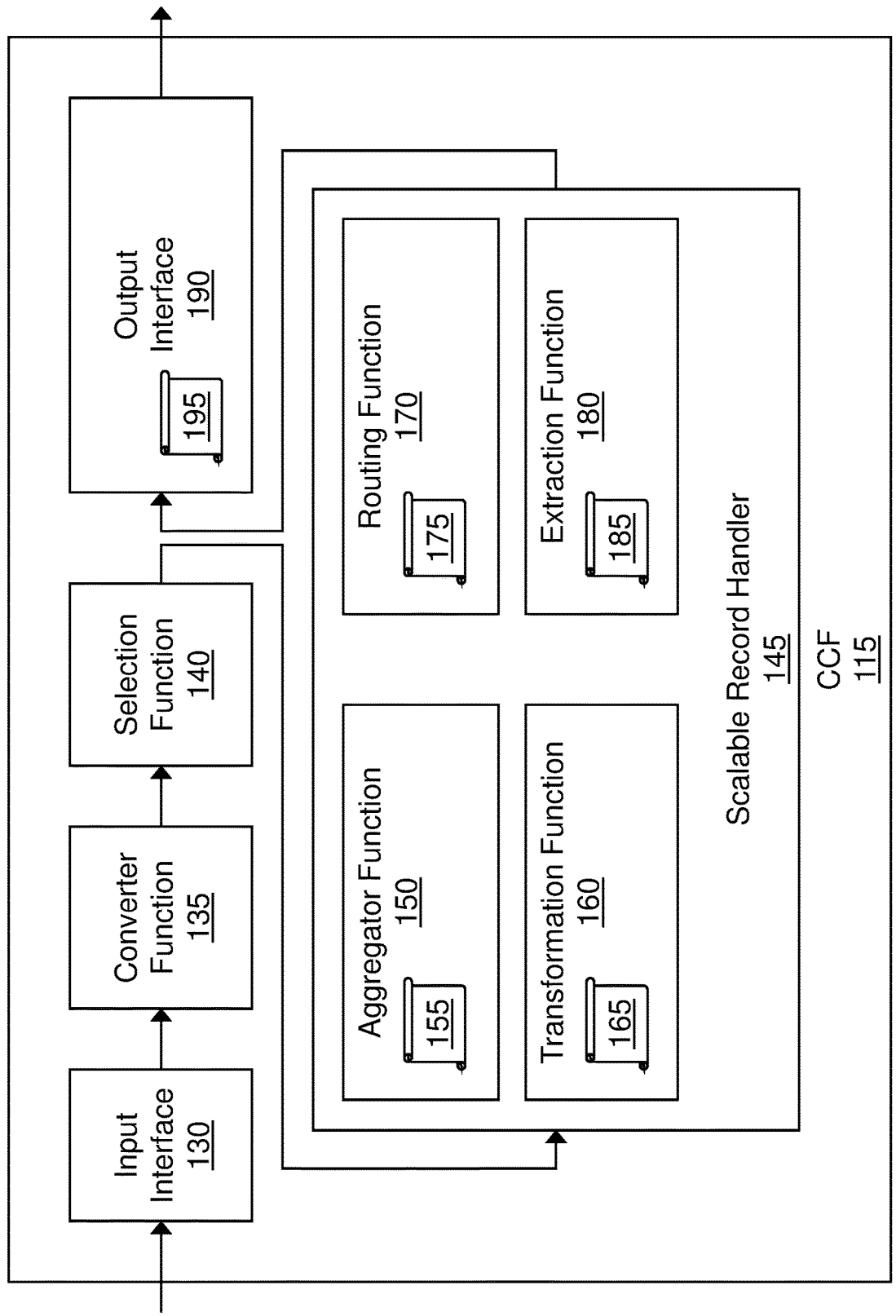
FIG. 2 shows a block diagram of an example of a CCF in accordance with embodiments.

Referring now to FIG. 2, there is shown schematically an example of a CCF. In this example, the CCF shown in FIG. 2 corresponds to the CCF shown in FIG. 1 and is therefore indicated in FIG. 2 using reference sign 115.

FIG. 2 shows the CCF 115 as comprising several components. While these components are depicted as separate components in FIG. 2, the separation is logical. As such, functionality of multiple ones of the components could be combined. The components may be provided by one or more physical hardware resources. For example, where the CCF 115 is cloud-based (or "virtualised"), the components depicted in FIG. 2 may be provided by a single physical hardware resource, for example by a single server, or may be provided by multiple physical hardware resources, for example by a pool of servers. Where multiple physical hardware resources are used, they may be located in one or more geographical locations. The CCF 115 may be implemented as a cluster of nodes. Nodes can be added to or removed from the cluster to provide scaling of the CCF 115, as described herein. Scaling may be performed at the CCF level. CCF-level scaling may, for example, involve adding or removing an instance of CCF 115. Scaling may alternatively or additionally be performed at the component level. Component-level scaling may, for example, involve adding or remove one or more components of the CCF 115.

The CCF 115 is configured to be customizable. As such, the CCF 115 may be referred to as a "customizable" CCF. The customizability of the CCF 115 provides additional flexibility compared to a non-customizable CCF. For example, the customizability of the CCF 115 in accordance with examples described herein may enable the CCF 115 to output reports based on data received from both the first and second CTFs 105, 110 in multiple different formats, in a scalable, efficient and/or readily deployable manner, while providing compatibility with existing network elements, whether to one or multiple recipient systems.

In addition to being customizable, the CCF 115 may interface with other elements of the telecommunications network 100 using standardized, or at least readily available, interfaces (such as Rf and XML interfaces) that may not involve resource-intensive development. As an alternative to this, the first and second CTF 105, 110 could, instead, be configured to output reports in preferred formats to the first and second recipient systems 120, 125 directly via customized interfaces. For example, the first and second CTF 105, 110 could be configured to output ACRs to the CCF 115 over an Rf interface and, separately, to output diagnostics reports to the first and second recipient systems 120, 125 directly over custom-built interfaces. However, such direct communication between the first and second CTF 105, 110 and the first and second recipient systems 120, 125 would potentially involve the use of non-standardized interfaces or at least development of customized interfaces, which may impact compatibility and ease of deployment. This is particularly the case for legacy recipient systems 120, 125 where such direct communication with the first and second CTF 105, 110, if even possible, may require significant resources.

Furthermore, providing the ability to output reports in different formats within the first and second CTFs 105, 110 would result in increased customization, deployment, management and maintenance complexity and efforts compared to the examples described herein where such functionality is provided in one place, namely the CCF 115. This would be further complicated in a telecommunications network that comprises more than two CTFs, as may the case with a typical telecommunications network deployment.

Moreover, in accordance with examples described herein, the ability to output reports in different formats is provided within the CCF 115 via a scalable transformation function. In contrast, providing functionality enabling multiple different output formats within the first and second CTFs 105, 110 would not allow for separate scaling of the first and second CTFs 105, 110 on the one hand and the transformation functionality on the other hand. In other words, such an implementation would not allow for separate scaling of call-handling network elements in the telecommunications network 100 and the transformation functionality described herein. In accordance with examples described herein, in which the transformation functionality is provided in the CCF 115, a new network element comprising a CTF (for example an AS) may be instantiated to meet increased call-handling demand in the telecommunications network 100 without necessarily having to allocate resources for another transformation function. In examples described herein, the transformation functionality provided in the CCF 115 is scalable independently of scaling of the first and second CTFs 105, 110.

Returning now to FIG. 2, in this example, the CCF 115 comprises an input interface 130. The input interface 130 is configured to receive input data. The input interface 130 may be configured to receive data in multiple formats. For example, the input interface 130 may be configured to receive Rf-format data and XML data. In examples, the CCF 115 receives, via the input interface 130, first and second notifications from the first and second CTFs 105, 110 respectively. The first and second notifications relate to network resource usage in the telecommunications network 100. The first and second notifications may comprise ACRs received over an Rf interface and/or XML data received over an XML interface.

In this example, the CCF 115 comprises a converter function 135. The converter function 135 is operable to convert data in one format into data in another format. The converter function 135 may be configured to pass-through data in a predetermined format without converting such data into another format. Alternatively or additionally, the CCF 115 may be configured such that data in the predetermined format bypasses the converter function 135. For example, the input interface 130 may be configured to determine whether or not a received notification is in the predetermined format and to either pass the given notification to the converter function 135 if the given notification is not in the predetermined format, or to cause the given notification to bypass the converter function 135 if the given notification is in the predetermined format. The predetermined format may correspond to an internal format. The internal format is used for processing at least some data within the CCF 115. The predetermined format may XML-based. For example, the predetermined format may correspond to an XML-format CDR. Where data received by the CCF 115 is not in the predetermined format (for example where the predetermined format is XML and where the CCF 115 received data over an Rf interface), the converter function 135 can convert such data into the predetermined format. This allows the CCF 115 to combine data from multiple different CTFs having different interfaces to the CCF 115 and/or to combine data from a given CTF that itself has different interfaces to the CCF 115. This may facilitate, for example, processing of data relating to the same communications session where multiple different network elements comprising respective CTFs are involved in that communications session.

In this example, the CCF 115 comprises a selection function 140. The selection function 140 is configured to select data input to the selection function 140 to be grouped together. The selection function 140 may group such data together and/or may indicate that such data should be grouped together to another component of the CCF 115. In some examples, the grouping is performed in response to the selection function 140 determining that the first and second notifications relate to the same telecommunications session (for example telephone call) as each other. Such determining may comprise correlating a first telecommunications session identifier comprised in the first notification with a second, corresponding telecommunications session identifier comprised in the second notification. An example of such a telecommunications session identifier is an IMS Charging Identifier (ICID). An ICID may be comprised in Rf messages. As such, the selection function 140 may correlate a first ICID comprised in the data based on the first notification with a second ICID comprised in the data based on the second notification and thereby determine that the data based on the first notification and the data based on the second notification both relate to the same telecommunications session as each other. As such, the selection function 140 may group data relating to the same telecommunications session together and/or may indicate that such data should be grouped together.

In this example, the CCF 115 comprises a scalable record handler 145. The scalable record handler 145 is depicted in FIG. 2 as comprising various components which will be described in more detail below. The scalable record handler 145 may be scaled in various different ways. Scaling the scalable record handler 145 may involve scaling resources, in which the resources allocated to the scalable record handler 145 are scaled. Scaling the scalable record handler 145 may alternatively or additionally involve scaling functionality, in which the functionality of the scalable record handler 145 is scaled. Scaling may involve increasing or decreasing. Scaling of the scalable record handler 145 may be implemented at the scalable record handler 145 level and/or at the component level. In other words, the scalable record handler 145 may be scaled itself, and/or one or more components of the scalable record handler 145 may be scaled without necessarily scaling all components of the scalable record handler 145.

Although the scalable record handler 145 is depicted as comprising several components in FIG. 2, data input to the scalable record handler 145 can be, but need not necessarily be, processed by all of the components of the scalable record handler 145. Furthermore, where data input to the scalable record handler 145 is processed by multiple ones of its components, such processing can be, but need not necessarily be, processed by the multiple components in a particular order. For example, first data input to the scalable record handler 145 may be processed by a first set of the components of the scalable record handler 145 in a first processing order, and second data input to the scalable record handler 145 may be processed by a second set of the components of the scalable record handler 145 (which may or may not be the same as the first set) in a second processing order (which may or may not be the same as the first processing order). As such, it should be understood that, in some examples, data input to the scalable record handler 145 is not processed by all of the components of the scalable record handler 145 that are depicted in FIG. 2.

As will be described in more detail below, in some examples data based on the first and second notifications is provided as an input to an aggregator function 150 of the CCF 115 for processing by the aggregator function 150. The data based on the first and second notifications may depend on the format of the first and second notifications. For example, where the first and/or second notification is in the predetermined format (for example XML), the data based on the first and second notifications can include data comprised in the first and/or second notification. In other words, such data may not be subject to conversion for inclusion in the data based on the first and second notification as it is already in the predetermined format (for example XML). However, where the first and/or second notification is not in the predetermined format (for example where it is received over an Rf interface), the first and/or second notifications can be converted (for example into XML format) and the converted data can be included in the data based on the first and second notifications. As such, the CCF 115 may, in response to determining that the first and/or second notification is not in the predetermined format (for example XML), use the converter function 135 to convert the first and/or second notification into the predetermined format (for example XML format). The CCF 115 may include the converted first and/or second notification in the data based on the first and second notifications. Further, the CCF 115 may, in response to determining that the first and/or second notification is in the predetermined format (for example XML format), include data comprised in the first and/or second notification in data based on the first and second notifications, without the need to first convert the data.

In this example, the CCF 115 comprises the aggregator function 150 referred to above. However, it will be understood that, in other examples, the aggregator function 150 is not used to process such data and may not even be provided in the scalable record handler 145 in some instances. As indicated above, in examples the aggregator function 150 is scalable and may therefore be referred to as the "scalable" aggregator function 150. The scalable aggregator function 150 may be scalable at the level of the scalable aggregator function 150 itself and/or at the level of the scalable record handler 145. The aggregator function 150 is configured to aggregate data. The CCF 115 aggregates, using the aggregator function 150, the data based on the first and second notifications to generate an aggregated network resource usage report. As indicated above, the data based on the first and second notifications may comprise the converted first and/or second notification and/or data comprised in the first and/or second notification.

The aggregating may comprise concatenating the data that is input to the aggregator function 150, in other words the data that is based on the first and second notifications, in order to generate the aggregated network resource usage report. Such data may have been grouped by the selection function 140 prior to being input to the aggregator function 150. For example, the data that is based on the first and second notifications may have been grouped together by the selection function 140 on the basis that the first and second notifications relate to the same telecommunications session as each other, and the aggregator function 150 may have concatenated such data on that basis. The aggregated network resource usage report may be in the same format as the data that is input to the aggregator function 150, namely the data that is based on the first and second notifications. For example, where the data that is based on the first and second notifications corresponds to XML-format CDRs, the aggregated network resource usage report may also be XML-format. For example, the aggregator function 150 may concatenate first and second, separate XML-format CDRs, corresponding to the data based on the first and second notifications, into a single, concatenated XML-format CDR (which may be referred to as a "super-CDR") and aggregate the XML-format super-CDR such that the output of the aggregator function 150 is a single XML file containing some or all of the data from some or all of the CTFs that handled the particular telecommunications session (for example a telephone call) and logged notifications related to that particular telecommunications session to the CCF 115. The aggregator function 150 may be configured to add surrounding XML tags to such an XML output file.

The aggregation performed by the aggregator function 150 may involve the use of one or more aggregation scripts 155. This may enable the aggregator function 150 to perform customized aggregation. Such an aggregator function 150 may therefore be referred to as a "customizable" aggregator function 150. The one or more aggregation scripts 155 may comprise standard scripts. The one or more aggregation scripts 155 may be in one or more scripting languages. The one or more scripting languages may be existing scripting languages. An example of such a script is an eXtensible Stylesheet Language Transformations (XSLT) script. Alternatively or additionally, such aggregating may involve use of a proprietary aggregation module. Using a scripting language may readily allow any desired changes to the way in which the aggregation is performed to be addressed with script changes. Script changes may be more efficient (for example, cheaper and easier) to maintain than if such changes involve significant custom development. As such, the customizable aggregator function 150 may use one or more aggregation scripts 155 to define where to take data from and how to aggregate it. This may be especially effective where, for example, the first and second recipient systems 120, 125 have different preferences and/or different regulatory requirements. This would not be possible if, for example, the customizable scripts were run on the first and second CTFs 105, 110 rather than on the CCF 115.

The aggregator function 150 may receive multiple inputs, corresponding to the data based on the first and second notifications, concatenate the multiple inputs into a single data item (for example in XML) and then process the single data item using the one or more aggregation scripts 155. This concatenation may be effective where the one or more aggregation scripts 155 take a single data item as an input, as is the case with XSLT scripts, for example. As such, the aggregator function 150 may thereby be able to process all of the data from the first and second CTFs 105, 110 together by concatenating such data prior to using the one or more aggregation scripts 155, and enable decisions about how the aggregation is to be performed by customizing the one or more aggregation scripts 155. Such aggregation-related decisions may correspond, for example, to which of the first and second CTFs 105, 110 is to be trusted for a particular field (or "element") in the aggregated network resource usage report. Examples of the field include, but are not limited to, start time, end time, duration, origin, destination etc. In more detail, the aggregator function 150 may preferentially select one indicated value for the particular field over another indicated value for the field. For example, where the field is 'start time', both indicated values for that start time field may be time values as determined by the first and second CTFs 105, 110. Both indicated values for the particular field may be the same, or one indicated value may be different from the other. As such, in this example, the preferential selection does not correspond to which fields are included in the aggregated network resource usage report, but which value(s) are included for particular fields. Enhanced customization may be provided by supporting changing the content of the aggregated network resource usage report, for example based on user-defined logic (for example, customer-defined logic). In some examples, the fields used in aggregated network resource usage reports are fixed (at least to some degree) in that they are included in several (for example, all) aggregated network resource usage reports and the preferential selection concerns determining which value(s) to use for such field(s). The aggregator function 150 function may provide a flexible framework that allows user-defined comparison and/or other logic via a flexible preference function, as opposed to a strict preference function being used.

The preferential selection may be based, at least in part, on the CTF from which the indicated values originate. For example, one of the first and second CTFs 105, 110 may be trusted (or "preferred") over the other of the first and second CTFs 105, 110 and the value originating from the more-preferred CTF may be used for the particular field instead of the value originating from the less-preferred CTF. Such preferences may be determined based on one or more preferential selection criteria. In some examples, a list of preferences is defined in relation to the first and second CTFs 105, 110, which influences which value(s) are selected for particular fields. The list may be user-defined, or otherwise. Such a list may rank or prioritize the first and second CTFs 105, 110 relative to each other, for example. In some examples, the preference is based on the CTF (or "system") of origin, in ranked order. For example, the value originating from an Access Session Border Controller (Access SBC) may be taken first. If that value is not present, then a value from a Telephony Application Server (TAS) may be taken. If that value is also not present, then a value from an Interconnect SBC may be taken. In some examples, the preference is based on the value being present in a list. For example, if any CTF reports that a call falls within a designated time period (for example a pre-configured 'happy hour' time period), that time may be preferentially used. In some examples, the preference is based on a most commonly reported value. For example, if two CTFs provide the same value and another CTF provides a different value, the value provided by the two CTFs is used in preference to all others. Other business logic and/or other logic the user may wish to configure may be used. Preferential selection may be based on multiple preferential selection criteria.

As such, in some examples, the first and second notifications comprise first and second telecommunications event data respectively, where the first and second telecommunications event data relate to the same telecommunications event. The telecommunications event may be a telephony event. Examples of telephony events include, but are not limited to, telephony calls, telephony messages (for example a Short Messaging Service (SMS) message or similar), and a telephony subscriber activating or deactivating a service. The first and second recipient systems 120, 125 may be capable of both session-based billing to cover billing telephone calls, and event-based billing to cover service activation and messages. The telecommunications event could therefore correspond to a telephone call. However, as indicated above, other types of telecommunication event are possible. The first telecommunications event data could indicate a start time of the telephone call as determined by the first CTF 105 and the second telecommunications event data could indicate a start time of the telephone call as determined by the second CTF 110. As explained above, the aggregating performed by the aggregator function 150 may comprise preferentially selecting one of the first and second telecommunications event data over the other of the first and second telecommunications event data and including the preferentially selected one of the first and second telecommunications event data in the aggregated network resource usage report. The aggregating performed by the aggregator function 150 may alternatively or additionally comprise including data based on both the first and second telecommunications event data in the aggregated network resource usage report. As such, the CCF 115 can provide customizable aggregation via the aggregator function 150. In particular, the CCF 115 can customisably choose how to select and combine data from multiple sources, namely multiple notifications from different CTFs. For example, when several CTFs handle the same call, they will all log overlapping data to the CCF 115. Such overlapping may correspond to the CTFs providing the same or different values for the same field. In order to provide a single output CDR file, the CCF 115 can choose which data to take from each CTF. If the CTFs have provided different start times for the call, for example, the CCF 115 may use the start time provided by a particular CTF over that from other CTFs, may use the earliest start time provided by the CTFs, the latest start time provided by the CTFs, the average start time, etc. This can provide a degree of conflict resolution and/or can enable discrepancies in indicated values to be identified.

In some examples, the CCF 115 includes at least one correlating identifier in the aggregated network resource usage report. The at least one correlating identifier may be included by the aggregator function 150 or otherwise. The correlating identifier may be generated by the CCF 115 and shared with at least one of the first and second recipient systems 120, 125. The correlating identifier need not be generated by the CCF 115. For example, the correlating identifier could be provided to the CCF 115. The correlating identifier may be unique to the CCF 115, the at least one of the first and second recipient systems 120, 125, and a given telecommunications session. In particular, the CCF 115 and the at least one of the first and second recipient systems 120, 125 may negotiate the correlating identifier in relation to the given telecommunications session. The correlating identifier may be provided to the at least one of the first and second recipient systems 120, 125 such that the at least one of the first and second recipient systems 120, 125 can subsequently identify the given telecommunications session and/or data associated with the given telecommunications session to the CCF 115. The at least one of the first and second recipient systems 120, 125 may be able to use the correlating identifier to retrieve data associated with the correlating identifier from the CCF 115 and/or the CCF 115 may be able to use the correlating identifier to retrieve data associated with the correlating identifier from the at least one of the first and second recipient systems 120, 125. The correlating identifier may be different from an ICID associated with the given telecommunications session. The correlating identifier may serve as a trail identifier, to enable a particular trail associated with the given telecommunications session to be identified, for example a trail of where data associated with the given telecommunications session has been processed and/or may be available. Multiple correlating identifiers may be associated with the given telecommunications session. Including such a correlating identifier in the aggregated network resource usage report enables customization relating to whether, and if so how, the correlating identifier is included in, or is provided in association with, usage detail reports. Usage detail reports will be described in more detail below. This may be especially effective in, for example, the case of diagnostics and/or testing. For example, the CCF 115 may be usable to test whether one of the first and second CTFs 105, 110 drops notifications relating to a particular type of failure event by comparing the notifications that that one of the first and second CTFs 105, 110 sends to the CCF 115 with notifications from the other of the first and second CTFs 105, 110. This may be useful where, for example, the first and second CTFs 105, 110 are comprised in different types of network elements. The inclusion of the at least one correlating identifier may allow the CCF 115 to produce a usage detail reports that counts missing notifications, but also includes direct links to further diagnostic information about the problematic flows. Such further diagnostic information may, for example, comprise traces for any telecommunications session (for example calls) that ended with partial billing records. As indicated above, the CCF 115 may be configured to include at least one correlating identifier in the aggregated network resource usage report. In scenarios in which the CCF 115 does not generate an aggregated network resource usage report, the at least one correlating identifier may still be included in other data. Such other data may correspond to the data based on the first notification and/or the data based on the second notification. More specifically, where the aggregator function 150 correlates multiple XML-format CDRs into a super-CDR, the at least one correlating identifier may be included in the super-CDR. Where the CCF 115 does not correlate multiple CDRs into a super-CDR, the at least one correlating identifier may be included in some or all of the multiple CDRs.

As such, the CCF 115 can both terminate Rf flows and receive XML files, and then perform aggregation across both data streams. For example, one or both of the first and second CTFs 105, 110 may provide both Rf and XML data streams to the CCF 115, where the Rf and XML streams include different data. The CCF 115 may, in accordance with examples, perform aggregation across both data streams from a given CTF. Alternatively or additionally, one of the first and second CTFs 105, 110 may support Rf streams only with the other supports XML only. The CCF 115 may, in accordance with examples, perform aggregation across the respective data streams from the respective CTFs. As such, the CCF 115 may handle both Rf and XML inputs. The CCF 115 may first use the converter function 135 to create internal format XML files from received Rf data and use XML-format inputs directly without conversion. The aggregator function 140 may then perform customized aggregation by concatenating all of the XML files (including the received XML-format data and the internally-generated XML data) and use the one or more aggregating scripts 155 to process the concatenated data to generate the aggregated usage detail report. As such, the CCF 115 may receive a third notification from, for example, the first CTF 105, where the third notification is in a different format to the first notification. For example, the first notification may be Rf-format and the third notification may be XML-format. In response to determining that the third notification relates to the same telecommunications event as the first and second notifications, data based on the third notification is aggregated to generate the aggregated network resource usage report.

In this example, the CCF 115 comprises a transformation function 160. As indicated above, in examples the transformation function 160 is scalable and may therefore be referred to as the "scalable" transformation function 160. The transformation function 160 may be scalable at the level of the transformation function 160 itself and/or at the level of the scalable record handler 145. The transformation function 160 transforms input data that is derived from the first and second notifications into transformed output data and is scalable as will be described in more detail below. The data derived from the first and second notifications may, for example, comprise the aggregated usage detail report. However, where the aggregator function 160 is not used, the data derived from the first and second notifications may comprise other data. Providing the transformation function in the CCF 115, compared to in the first and second CTFs 105, 110 for example, enables transformation to be performed after aggregation has occurred. This may be used, for example, to produce one CDR file from multiple different CTFs.

In examples, the transformation function 160 transforms the aggregated usage detail report into one or more usage detail reports in one or more usage detail report formats. For example, the transformation function 160 may transform the aggregated usage detail report into a first usage detail report in a first usage detail report format and a second usage detail report in a second, different usage detail report format. As such, the transformation function 160 can transform internal format data into output format data.

The transformation performed by the transformation function 160 may involve the use of one or more transformation scripts 165. This may enable the transformation function 160 to perform customized transformation. Such a transformation function 160 may therefore be referred to as a "customizable" transformation function 160. The one or more transformation scripts 165 may comprise standard scripts. The one or more transformation scripts 165 may be in one or more scripting languages. The one or more scripting languages may be existing scripting languages. An example of such a script is an XSLT script. Alternatively or additionally, such transforming may involve use of a proprietary transformation module.

As indicated above, in addition to transforming input data into transformed output data, the transformation function 160 is scalable. Scaling the transformation function 160 may comprise modifying (for example increasing or decreasing) the resources allocated to the transformation function 160. This may, for example, be as a result of changes in demand on the transformation function 160. Scaling the transformation function 160 may comprise providing the CCF 115 with a further transformation function or removing an existing transformation function from the CCF 115, where the CCF 115 can support multiple transformation functions. Scaling the transformation function 160 may comprise providing the transformation function 160 with more or less functionality. For example, such scaling may involve increasing the number of output formats supported by the CCF 115, but could involve decreasing the number of output formats. Some examples comprise scaling the transformation function 160 so that the transformation function 160 is operable to transform an aggregated network resource usage report, aggregated from data based on notifications received from the first and second CTFs 105, 110, into a third usage detail report in a third usage detail report format without scaling the first and second CTFs 105, 110. The third usage detail report format is different from the first and second usage detail report formats referred to above. As such, the range of output formats supported by the CCF 115 may be expanded by scaling the transformation function 160. Scaling of the transformation function 160 may be performed in response to detecting a scaling trigger. An example of a scaling trigger is a Central Processing Unit (CPU) threshold being reached. For example, the transformation function 160 may be scaled up when a first CPU threshold is reached and may be scaled down when a second, lower CPU threshold is reached. This provides a well-defined, measurable metric for scaling the transformation function 160. Scaling of one or more other components of the scalable record handler 145 and/or scaling of the scalable record handler 145 itself may be based on corresponding considerations.

In some examples, the transforming of the aggregated network resource usage report is based on identifying first and second recipient system identifiers associated with the first and second recipient systems 120, 125 respectively. As such, the transformation function 160 can identify the first and second recipient systems 120, 125 and tailor the content of the first and second usage detail report formats accordingly. The first and second recipient system identifiers may be received from the first and second recipient systems 120, 125 respectively or otherwise.

The CCF 115 may use the identified first and second recipient system identifiers to determine the first and second usage detail report formats. For example, the CCF 115 could receive a request for a usage detail report from the first recipient system 120, identify the first recipient system identifier (for example if the first recipient system identifier is received in the request, or otherwise), determine the first usage detail report format based on the first recipient system identifier, and output the first usage detail report in the first usage detail report format accordingly. Alternatively or additionally, the CCF 115 could be configured to generate the first and second usage detail reports in the first and second usage detail report formats on the basis that they will be, or are at least likely to be, requested by the first and second recipient systems 120, 125 such that the first and second usage detail reports can be provided to the first and second recipient systems 120, 125 based on the first and second recipient system identifiers when requested by the first and second recipient systems 120, 125.

As an alternative to, or in addition to, using the first and second recipient system identifiers, the CCF 115 may store configuration data indicating which usage detail report formats are to be used and to make second usage detail reports in those second usage detail report formats available to one or both of the first and second recipient systems 120, 125. For example, the CCF 115 may make both the first and second usage detail reports available to both the first and second recipient systems 120, 125. The first and second usage detail reports, or data in which they are comprised, could be made available such that the intended recipient system can be readily identified. For example, the first and second usage detail reports, or data in which they are comprised, could be given filenames that indicate the intended recipient system. For example, a usage detail report, or data in which it is comprised, could include "diagnostics" in its file name, for example as a prefix, to indicate that it is intended for a diagnostics system. Alternatively or additionally, a usage detail report, or data in which it is comprised, could be stored in a "Diagnostics" directory to indicate that it is intended for a diagnostics system. Alternatively or additionally, recipient systems could be given permissions to be able to obtain only a subset of all of the available usage detail reports.

In some examples, the CCF 115 comprises a routing function 170. As indicated above, in examples the routing function 170 is scalable and may therefore be referred to as the "scalable" routing function 170. The routing function 170 may be scalable at the level of the routing function 170 itself and/or at the level of the scalable record handler 145. The routing function 170 is configured to decide which of multiple usage detail reports are to include data based on the first and/or second notifications. For example, where the aggregator function 150 aggregates the data based on the first and second notifications to generate the aggregated resource usage report, the routing function 170 may be configured to decide which of multiple usage detail reports are to include data comprised in the aggregated resource usage report. Where the data based on the first and second notifications is not aggregated, the routing function 170 is configured to decide which of multiple usage detail reports include such data. The multiple usage detail reports may have the same or different usage detail report formats. For example, the routing function 170 may be configured to split by trunk group.

The routing performed by the routing function 170 may involve the use of one or more routing scripts 175. This may enable the routing function 170 to perform customized routing. Such a routing function 170 may therefore be referred to as a "customizable" routing function 170. The one or more routing scripts 175 may comprise standard scripts. The one or more routing scripts 175 may be in one or more scripting languages. The one or more scripting languages may be existing scripting languages. An example of such a script is an XSLT script. Alternatively or additionally, such routing may involve use of a proprietary routing module. As such, the customizable CCF 115 allows standard scripts (for example, XSLT scripts) to make routing decisions based on potentially arbitrary parts of the data input to the transformation function 160 which may, or may not, be in the form of an aggregated resource usage report as described above.

As such, in addition to providing customizable aggregation via the aggregator function 150, the CCF 115 can also provide customizable transformation via the transformation function 160. In particular, in addition to customisably choosing how to select and combine data from multiple sources, the CCF 115 can also customisably reformat data using the transformation function 160. The transformation function 160 can use the one or more customizable transformation scripts 165 to define how to format the usage detail reports. As with the customizable aggregation, this would not be possible if the customizable scripts were run on the first and second CTFs 105, 110 rather than on the CCF 115.

In some examples, the CCF 115 comprises an extraction function 180. As indicated above, in examples the extraction function 180 is scalable and may therefore be referred to as the "scalable" extraction function 180. The extraction function 180 may be scalable at the level of the extraction function 180 itself and/or at the level of the scalable record handler 145. The extraction function 180 is configured to extract data. In some examples, the CCF 115 outputs data that is comprised in the aggregated network resource usage report and that is not comprised in at least one of the first and second usage detail reports in association with the outputting of the at least one of the first and second usage detail reports. This may allow customizable file headers and/or footers. For example, data from the data input to the transformation function 160 (which input data may or may not be aggregated) may be extracted. The extracted data may be in the form of metadata. Such extraction may be performed by one or more extraction scripts 185 associated with the extraction function 180. The extracted data may not be in the first and second usage detail reports that are output by the transformation function 160. For example, the extracted data may not desirable and/or required to be included in the first and second usage detail reports. The extracted data may then be stored alongside the first and/or second usage detail reports. When the first and/or second usage detail reports are output, by themselves and/or in combination with one or more further usage detail reports, the extracted data may be output in association with the first and/or second usage detail reports. The extracted data may, for instance, be used to produce a customized file header and/or footer. For example, the customized file header may indicate the number of records of different types included in an output file. As such, the usage detail reports (for example CDRs) as produced by the transformation function 160 may not need to be read or altered again later. In more detail, a set of usage detail reports can be selected for inclusion in a single output file. The set of usage detail reports may be selected based on associated times. For example, all usage detail reports for a given five-minute time period may be selected for inclusion in a single output file. The selected set of usage detail reports may be concatenated. Any desired header and/or footer, for example a customized header and/or footer, may then be generated from the extracted data (for example, metadata). This can enhance performance compared to alternative techniques. In particular, most or all of the transformation work may be performed before the specific usage detail reports that will be combined together into a particular output file are known. When those specific usage detail reports that will be combined are identified, more limited re-parsing of the extracted data (for example, metadata) may be performed. This can also help maintain good practice in that the contents of the usage detail reports may remain intact and unmodified once they have been created. This may be of regulatory interest, for example. This can also allow, for example, headers and/or footers to be created based on information that is not easily extractable from the usage detail reports once they have been created, where such information is not in the usage detail reports. For example, such information may otherwise have been discarded, multiple different components would need to understand the various usage detail report formats, and/or the usage detail reports may have been encrypted before storage in the CCF 115.

The CCF 115 may be configured with a pipeline of scripts. For example, as indicated above, the CCF 115 may be configured with a pipeline of one or more aggregation scripts 155 that are used by the aggregator function 150 for example to select data to be included in the aggregated usage detail report, one or more transformation scripts 165 that are used by the transformation function 160 for example to produce a desired the output format, one or more routing scripts 175 that are used by the routing function 170 to perform routing, and/or one or more extraction scripts 185 that are used by the extraction function 180 to perform extraction as described above. This may enhance maintainability and may allow reuse of shared components (for example shared scripts) across multiple deployments. In some examples, the same script(s) may be used by any of the components of the scalable record handler 145.

The CCF 115 comprises an output interface 190. The output interface 190 is configured to output data to the first and second recipient systems 120, 125. The CCF 115 outputs, via the output interface 190, the first and second usage detail reports to the first and second recipient systems 120, 125 respectively. The output interface 190 may use FTP and/or another protocol.

The first and second usage detail reports may be output by themselves or with other data. For example, other data may be combined with the first and/or second usage detail reports to form one or more output files, which comprise the first and/or second usage detail reports. For example, where the first and/or second usage detail reports correspond to CDRs, multiple such usage detail report could be combined together into a CDR file. The output interface 190 may use one or more output scripts 195, for example to determine what, if any, other data is to be output with the first and second usage detail. For example, the one or more output scripts 195 may be used to assemble a header and/or footer from (already extracted) metadata and/or to perform other transformations of a given output file that are only possible once all of the usage detail reports (for example CDRs) to be included in the given output file have been decided and identified.

As indicated above, the CCF 115 may be configured to provide multiple functions simultaneously. For example, the CCF 115 may be configured to provide a primary billing output and a full audit record, at the same time. In some such examples, at least one of the first and second recipient systems 120, 125 comprises an audit system. In such examples, an output usage detail report may be in an audit format. As such, billing data may be kept not for the primary purpose of billing, but to satisfy internal or regulatory audit requirements, such as investigating billing discrepancies. In some such examples, at least one of the first and second recipient systems 120, 125 comprises a diagnostics system. In such examples, an output usage detail report may be in a diagnostics format. Such an output usage detail report may comprise details about calls that failed. Such details may identify invoked call services, selected network elements etc. In some such examples, at least one of the first and second recipient systems 120, 125 comprises an analytics system. In such examples, an output usage detail report may be in an analytics format. In some such examples, at least one of the first and second recipient systems 120, 125 comprises a network performance system. In such examples, an output usage detail report may be in a network performance format. Such an output usage detail report may report on network performance and/or network availability. Such an output usage detail report may comprise statistics on call volumes over time, statistics on load balancing across network elements, apparent availability of network elements or parts of the network etc. In some such examples, at least one of the first and second recipient systems 120, 125 comprises a usage detail report analysis system. In such examples, an output usage detail report may be in a usage detail report analysis format. Such an output usage detail report may indicate a number of partial billing records, for example. In some such examples, at least one of the first and second recipient systems 120, 125 comprises a lawful interception system. In such examples, an output usage detail report may be in a lawful interception format. Such an output usage detail report may comprise sufficient information to satisfy one or more law enforcement agency needs for signalling information. In some such examples, at least one of the first and second recipient systems 120, 125 comprises a testing system. In such examples, an output usage detail report may be in a testing format. The CCF 115 may thereby be used to test whether any information is lost over certain failure events by comparison of records from affected and unaffected network elements. For example, the number of CDRs received from one network element could be compared to the number received from another CDR and if the numbers differ from an expected number, action may be taken.

Some examples comprise transforming, using the transformation function 160, the aggregated network resource usage report into at least one further usage detail report in at least one further usage detail report format and outputting, via the output interface 190, the at least one further usage detail report. The CCF 115 may thereby be configured to provide forking. In such cases, data input to the transformation function 160 (which data may or may not be aggregated) can be used for multiple purposes at the same time, for example for audit and billing purposes. Including forking mid-pipeline may have performance benefits compared to forking at one or more other parts of the pipeline. One possible use case of forking is to handle call services scenarios. An example of such a call service scenario is call forwarding. Billing systems may expect multiple CDRs per forwarded call, but may not expect the same number as the number of CTFs involved in the call, or may not expect multiple CDRs in some circumstances. As such, a degree of aggregation may still be effective. In some examples, an aggregated resource usage report is generated with all information related to a telecommunications session (for example a call), but multiple output resource usage reports are created based on the aggregated resource usage report.

Some examples described above comprise preferential selection of one value for a field over another value for a field. In some examples, the data output by the output interface 190 communicates data indicative of the aggregation and/or preferential selection performed to the first and/or second recipient system 120, 125. This can allow the first and/or second recipient system 120, 125 to act on such information. For example, if a value was selected from a list, or a sub-optimal choice of selected value was made, this can be communicated via a CDR to the first and/or second recipient system 120, 125. The CDR may, for example, indicate that the selected value may be inaccurate as the accurate value(s) were not included, may communicate that a call to which the CDR relates was a 'happy hour' call and special billing was applied, etc. Such information may be communicated in various ways. For example, the CDR name may be changed to reflect this, for example such that 'happy hour' calls are separated from other calls. The storage location for the CDR may be changed to reflect this, for example such that 'happy hour' calls from other calls. Additional information may be added into the CDR. For example, a warning flag indicating that there is incomplete information and that a best estimate has been used may be included. The first and/or second recipient system 120, 125 can then, for example, investigate why information is not being reported correctly if a significant number of inaccurate records are received, can meet legal obligations (for example if there is uncertainty about call lengths), debug a preference function, communicate to customers, and/or to make commercial decisions.

Various measures (for example methods, computer programs, network elements and telecommunications networks) are provided in relation to which data can be processed in a telecommunications network. First and second notifications are received, via an input interface, from first and second CTFs respectively in the telecommunications network. The first and second notifications relate to network resource usage in the telecommunications network. A scalable transformation function is used to transform data derived from the first and second notifications into a first usage detail report in a first detail report format and a second usage detail report in a second, different detail report format. The first and second usage detail reports are output, via an output interface, to at least one recipient system respectively. As such, increased flexibility compared to other possible deployments may be provided. In particular, the usage detail reports can be output in multiple different formats. In addition, by providing the scalable transformation function in this manner, as opposed for example to in the CTFs, call processing and transformation functions are separately scalable.

Some examples comprise scaling the scalable transformation function so that the scalable transformation function is operable to transform an aggregated network resource usage report, aggregated from data comprised in notifications received from the first and second CTFs, into a third detail report in a third detail report format without scaling the first and second CTFs, the third detail report format being different from the first and second detail report formats. Some examples comprising scaling the scalable transformation function by providing additional resources to the scalable transformation function. As such a degree of optimization may be provided in relation to meeting the demands in the telecommunications network while using available resources efficiently.

Some examples comprise transforming, using the scalable transformation function, the data derived from the first and second notifications into at least one further usage detail report in at least one further usage detail report format, and outputting, via the output interface, the at least one further usage detail report. As such, forking may be provided so that such data can, in effect, be reused while enabling a wider range of usage detail report formats to be used.

The at least one recipient system comprises first and second recipient systems and wherein said outputting comprises outputting the first and second usage detail reports to the first and second recipient systems respectively. As such, different recipient systems having different usage detail report format preferences may be supported.

In some examples, the telecommunications network provides telecommunications services to first and second sets of subscribers and wherein the first and second sets of subscribers are associated with the first and second recipient systems respectively. As such, tailored data can be provided to the first and second recipient systems based on the data that is passed on to their respective subscribers, or at least data that is used to generate reports that are passed on to their respective subscribers.

Some examples comprise aggregating data based on the first and second notifications to generate an aggregated network resource usage report, wherein the data derived from the first and second notifications comprise the aggregated network resource usage report. The provision of the scalable transformation function in this manner, as opposed for example to in the CTFs, enables transformation to be performed on aggregated data based on data received from multiple CTFs.

In some examples, the aggregating is performed in response to determining that the first and second notifications relate to the same telecommunications session as each other. In some examples, the determining comprises correlating a first telecommunications session identifier comprised in the first notification with a second, corresponding telecommunications session identifier comprised in the second notification. In some examples, the first and second telecommunications session identifiers are both ICIDs. This can provide a reliable mechanism to bundle notifications relating to, for example, the same telephone call together. In particular, ICIDs can be reliably identified in data received over Rf interfaces.

In some examples, the first and second notifications comprise first and second telecommunications event data respectively, the first and second telecommunications event data relating to the same telecommunications event, and wherein the aggregating comprises preferentially selecting one of the first and second telecommunications event data over the other of the first and second telecommunications event data and including said preferentially selected one of the first and second telecommunications event data in the aggregated network resource usage report and/or including data based on both the first and second telecommunications event data in the aggregated network resource usage report. As such, flexibility is provided in terms of which data is or is not included in the aggregated network resource usage report.

Some examples comprise, prior to the aggregating, in response to determining that the first and/or second notification is not in a predetermined format, converting the first and/or second notification into the predetermined format and including data comprised in the converted first and/or second notification in the data based on the first and second notifications. Some examples comprise, prior to the aggregating, in response to determining that the first and/or second notification is in the predetermined format, including data comprised in the first and/or second notification in the data based on the first and second notifications. In some examples, the predetermined format is XML-based. As such, the aggregator function can receive input data, received via various types of interface, in the predetermined format.

Some examples comprise including at least one correlating identifier in the aggregated network resource usage report, the correlating identifier being useable by the at least one recipient system to identify data associated with the first and second notifications. This may facilitate fault analysis.

Some examples comprise outputting data that is comprised in the aggregated network resource usage report and that is not comprised in at least one of the first and second usage detail reports in association with the outputting of the at least one of the first and second usage detail reports. This may provide useful additional data to downstream recipient systems, which would otherwise not be available.

In some examples, the transforming comprises using one or more scripts. In some examples, the one or more scripts comprise an XSLT script. The use of one or more scripts provides the customizability described herein by enabling a relatively large number of usage detail report formats to be used with relatively low requirements compared to where lower, or no customizability is provided. In particular, the resources involved in extending the number of usage detail report formats may be lower via the use of XSLT scripts than via the use of proprietary modules that may involve significant customization and development. Further still, usage detail report formats may more readily be customized post-deployment via the use of scripts, providing more flexibility than where usage detail report formats have to be defined pre-deployment.

In some examples, the input interface comprises a Diameter-based Rf interface. In some examples, the input interface comprises an XML-based interface. This can enable the use of interfaces that may be readily available to CTFs, such as Rf and XML interfaces, to receive data from the CTFs, compared to other implementation in which custom interfaces are used. Further, the CTFs can use such interfaces to communicate indirectly with recipient systems via the CCF, rather than other possible deployments in which the CTFs communicate directly with the recipient systems over highly customized interfaces.

In some examples, at least one of the first and second recipient systems comprises a subscriber charge generation system. In some examples, at least one of the first and second recipient systems comprises an audit system, a diagnostics system, an analytics system, a network performance system, a network availability system, a usage detail report analysis system, a lawful interception system, and/or a testing system. As such, a wide variety of different downstream recipient systems may be supported.

In some examples, the data processing is performed by a CCF. A CCF is a particularly effective network element in which to employ the techniques described herein.

Various measures (for example methods, computer programs, network elements and telecommunications networks) are provided in relation to which data can be processed by a CCF in a telecommunications network. At least one notification is received, via an input interface, from at least one network element of a plurality of different network elements in the telecommunications network. The at least one network element comprises at least one CTF. The at least one notification relates to usage of network resources in the telecommunications network. Data based on data comprised in the at least one notification is transformed, using a scalable transformation function, into at least one usage detail report. The at least one usage detail report is output to at least one recipient system of a plurality of different recipient systems. As such, the scalable transformation function in the CCF can be scaled separately from any scaling of the at least one CTF.

The above examples are to be understood as illustrative examples. Further examples are envisaged.

Examples described above refer to an internal format. The internal format may be anywhere on a range from highly different from the usage detail reports formats to the same as the usage detail reports formats. As explained above, in some examples, XML records are created from input Rf streams, all such created records that relate to the same telecommunications session are identified (for example by virtue of having matching ICIDs), any input XML records relating to the same telecommunications session (for example by virtue of having matching ICIDs) are collected, and then those created XML records and input XML records are concatenated into an aggregated XML file to which transformations may be applied. However, an internal format other than XML may be used. For example, JavaScript Object Notation (JSON) could be used instead of XML.

Examples described above relate to using one or more scripts to perform various operations. In those examples, the one or more scripts are based on existing scripting languages, of which XSLT is an example. In other examples, such operations could be performed in another way. For example, instead of using one or more existing scripting languages, a proprietary element could be used. This may, however, involve custom development to extend the CCF 115 for each new output format the CCF 115 is to support. This may involve significant resources and custom configuration is likely to become unwieldy long before the output flexibility approaches that of the script-based CCF solution described above.

Examples described above relate to use of the converter function 135 and aggregator function 150. However, examples are envisaged in which one or both of these is not used. In particular, examples are envisaged in which the CCF 115 receives a notification from a network element of a plurality of different network elements in the telecommunications network 100, where the notification relates to usage of network resources in the telecommunications network. The CCF 115 may receive one such notification or more than one such notification and the one or more such notifications may be received from one or more than one such network element. The network element comprises a CTF. Data based on data comprised in the notification is transformed, using the transformation function 160, into a usage detail report. Such data (which may be comprised in one notification or more than one notification) may be transformed into one usage detail report or more than one usage report. The one or more usage reports are output to a recipient system of a plurality of different recipient systems. The one or more usage reports may be output to one or more than one such recipient system. Although, in such examples, conversion and aggregation are not necessarily provided, a CCF 115 that is scalable separately from any scaling of the CTF(s) is provided.

Examples of aggregation have been described above. Some such examples implement a Voice over LTE (VoLTE) pipeline, which is a set of XSLT scripts acting on aggregated CDRs to produce a target output in a VoLTE network. In examples, ASN.1-format CDRs are built based on Rf sessions and Rf events. Such CDRs are then stored in an in-memory database. The CDRs may have an ICID identifying which call they relate to. In some examples, a series of timers is run to decide when all of the information for a particular call (or other event) has been received. Such timers are described in more detail below. Once it has been determined that all information for a particular call has been received, all of the records with the same ICID are extracted from the in-memory database and are passed to the transformation function 160 in one HTTP request. A pipeline is then run. The first action of the pipeline turns the ASN.1 data into XML. The second action of the pipeline is to concatenate all of the XML fragments and, in some examples, to add a surrounding parent element, to give a valid XML. Then the super-CDR is transformed into one or more outputs. XML-format CDRs may be provided to the transformation function 160 alongside ASN.1-format records. Such records would skip the first action of the pipeline, but would be included at the second action. As indicated above, a series of timers may be run to determine when all information for a particular call is available. For a given Diameter session, a session timer may be run. The timer may be reset each time a message (for example, an INTERIM ACR) is received on the session. The session may end when either the session timer pops (for example, when an INTERIM ACR is not received within approximately twice the expected time) or when a STOP ACR is received. A relatively small delay (for example one minute, which may be configurable) is allowed after receiving a STOP ACR to allow "late INTERIMs" (in other words, INTERIM ACRs that arrive out of the order they were sent) to be taken into account. Such INTERIM ACRs may include important information not present in the STOP ACR. For example, an INTERIM ACR may include information about a media change. After that delay, the CDR is transformed and put into non-volatile storage. In some examples, all open sessions with the same ICID are tracked. When one session finishes, the delay is extended until all other sessions with the same ICID are closed, namely STOPped or timed out. This allows all such CDRs to be collated and sent to be transformed and/or stored together. In some examples, a relatively short delay is allowed after the last session with a given ICID closes. This allows for "late INTERIMs" on that session, as above, but also allows for entirely new sessions with the same ICID to be STARTed. This might happen in, for example, call forwarding scenarios. In such examples, all of the information for a call (in other words, a series of sessions or events with the same ICID) may be aggregated, even if the sessions or events do not fully overlap.

As such, partial, incomplete, and/or inaccurate records may readily be identified.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The following numbered clauses on pages 34 to 38 of the present description correspond to the claims of UK patent application no. 1809833.5, to which the present application claims priority, as filed. The claims of the present application as filed can be found on the subsequent pages 39 to 42 of the specification which begin with the heading "CLAIMS".

1. A method of processing data in a telecommunications network, the method comprising:
   receiving, via an input interface, first and second notifications from first and second Charging Trigger Functions, CTFs, respectively in the telecommunications network, the first and second notifications relating to network resource usage in the telecommunications network;
   using a scalable transformation function to transform data derived from the first and second notifications into a first usage detail report in a first detail report format and a second usage detail report in a second, different detail report format; and
   outputting, via an output interface, the first and second usage detail reports to at least one recipient system.

2. A method according to claim 1, comprising scaling the scalable transformation function so that the scalable transformation function is operable to transform an aggregated network resource usage report, aggregated from data comprised in notifications received from the first and second CTFs, into a third detail report in a third detail report format without scaling the first and second CTFs, the third detail report format being different from the first and second detail report formats.

3. A method according to claim 1 or 2, comprising scaling the scalable transformation function by providing additional resources to the scalable transformation function.

4. A method according to any of claims 1 to 3, comprising:
   transforming, using the scalable transformation function, the data derived from the first and second notifications into at least one further usage detail report in at least one further usage detail report format; and
   outputting, via the output interface, the at least one further usage detail report.

5. A method according to any of claims 1 to 4, wherein the at least one recipient system comprises first and second recipient systems and wherein said outputting comprises outputting the first and second usage detail reports to the first and second recipient systems respectively.

6. A method according to claim 5, wherein the telecommunications network provides telecommunications services to first and second sets of subscribers and wherein the first and second sets of subscribers are associated with the first and second recipient systems respectively.

7. A method according to any of claims 1 to 6, comprising aggregating data based on the first and second notifications to generate an aggregated network resource usage report, wherein the data derived from the first and second notifications comprises the aggregated network resource usage report.

8. A method according to claim 7, wherein said aggregating is performed in response to determining that the first and second notifications relate to the same telecommunications session as each other.

9. A method according to claim 8, wherein said determining comprises correlating a first telecommunications session identifier comprised in the first notification with a second, corresponding telecommunications session identifier comprised in the second notification.

10. A method according to claim 9, wherein the first and second telecommunications session identifiers are both IP Multimedia Subsystem (IMS) Charging Identifiers (ICIDs).

11. A method according to any of claims 7 to 10, wherein the first and second notifications comprise first and second telecommunications event data respectively, the first and second telecommunications event data relating to the same telecommunications event, and wherein said aggregating comprises:
   preferentially selecting one of the first and second telecommunications event data over the other of the first and second telecommunications event data and including said preferentially selected one of the first and second telecommunications event data in the aggregated network resource usage report; and/or
   including data based on both the first and second telecommunications event data in the aggregated network resource usage report.

12. A method according to any of claims 7 to 11, comprising prior to said aggregating:
   in response to determining that the first and/or second notification is not in a predetermined format, converting the first and/or second notification into the predetermined format and including data comprised in the converted first and/or second notification in the data based on the first and second notifications 13. A method according to any of claims 7 to 12, comprising prior to said aggregating:
   in response to determining that the first and/or second notification is in the predetermined format, including data comprised in the first and/or second notification in the data based on the first and second notifications.

14. A method according to claim 12 or 13, wherein the predetermined format is XML-based.

15. A method according to any of claims 7 to 14, comprising including at least one correlating identifier in the aggregated network resource usage report, the correlating identifier being useable by the at least one recipient system to identify data associated with the first and second notifications.

16. A method according to any of claims 7 to 15, comprising outputting data that is comprised in the aggregated network resource usage report and that is not comprised in at least one of the first and second usage detail reports in association with the outputting of the at least one of the first and second usage detail reports.

17. A method according to any of claims 1 to 16, wherein said transforming comprises using one or more scripts.

18. A method according to claim 17, wherein the one or more scripts comprise an eXtensible Stylesheet Language Transformations (XSLT) script.

19. A method according to any of claims 1 to 18, wherein the input interface comprises a Diameter-based Rf interface and/or an XML-based interface.

20. A method according to any of claims 1 to 19, wherein the at least one recipient system comprises:
   a subscriber charge generation system;
   an audit system;
   a diagnostics system;
   an analytics system;
   a network performance system;
   a network availability system;
   a usage detail report analysis system;
   a lawful interception system; and/or
   a testing system.

21. A method according to any of claims 1 to 20, wherein the method is performed by a charging collection function, CCF.

22. A computer program arranged to perform a method according to any of claims 1 to 21.

23. A network element configured to perform a method according to any of claims 1 to 21.

24. A telecommunications network comprising a network element according to claim 23 in combination with at least one further network element, the at least one further network element comprising the first and second CTFs.

25. A method of processing data in a telecommunications network, the method comprising:
receiving, via an input interface, at least one notification from at least one network element of a plurality of different network elements, in the telecommunications network, the at least one notification relating to usage of network resources in the telecommunications network;
transforming, using a scalable transformation function, data based on data comprised in the at least one notification into at least one usage detail report; and
outputting, via an output interface, the at least one usage detail report to at least one recipient system of a plurality of different recipient systems,
wherein the at least one network element comprises at least one charging trigger function, CTF, and
wherein the method is performed by a charging collection function, CCF.

The invention claimed is:
1. A method of processing data in a telecommunications network, the method comprising:
receiving, via an input interface, first and second notifications from first and second Charging Trigger Functions, CTFs, respectively in the telecommunications network, the first and second notifications relating to network resource usage in the telecommunications network, wherein the first and second notifications comprise first and second telecommunications event data respectively, wherein the first and second telecommunications event data both relate to a particular field for an aggregated network resource usage report, and wherein the first telecommunications event data is different from the second telecommunications event data;
in response to determining that the first and second notifications relate to the same telecommunications event as each other, aggregating data based on the first and second notifications to generate the aggregated network resource usage report, wherein said aggregating comprises preferentially selecting one of the first and second telecommunications event data over the other of the first and second telecommunications event data and including said preferentially selected one of the first and second telecommunications event data in the particular field of the aggregated network resource usage report;
using a scalable transformation function to transform the aggregated network resource usage report into a first usage detail report in a first usage detail report format and a second usage detail report in a second, different usage detail report format; and
outputting, via an output interface, the first and second usage detail reports to at least one recipient system.

2. The method of claim 1, comprising scaling the scalable transformation function so that the scalable transformation function is operable to transform an aggregated network resource usage report, aggregated from data comprised in notifications received from the first and second CTFs, into a third usage detail report in a third usage detail report format, the third usage detail report format being different from the first and second usage detail report formats.

3. The method of claim 1, comprising scaling the scalable transformation function by providing additional resources to the scalable transformation function.

4. The method of claim 1, wherein the telecommunications event is a telephony event.

5. The method of claim 1, wherein the at least one recipient system comprises first and second recipient systems and wherein said outputting comprises outputting the first and second usage detail reports to the first and second recipient systems respectively.

6. The method of claim 5, wherein the telecommunications network provides telecommunications services to first and second sets of subscribers and wherein the first and second sets of subscribers are associated with the first and second recipient systems respectively.

7. The method of claim 1, wherein said determining comprises correlating a first telecommunications session identifier comprised in the first notification with a second, corresponding telecommunications session identifier comprised in the second notification.

8. The method of claim 7, wherein the first and second telecommunications session identifiers are both IP Multimedia Subsystem, IMS, Charging Identifiers, ICIDs.

9. The method of claim 1, comprising prior to said aggregating:
in response to determining that the first and/or second notification is not in a predetermined format, converting the first and/or second notification into the predetermined format and including data comprised in the converted first and/or second notification in the data based on the first and second notifications.

10. The method of claim 1, comprising prior to said aggregating:
in response to determining that the first and/or second notification is in the predetermined format, including data comprised in the first and/or second notification in the data based on the first and second notifications.

11. The method of claim 1, wherein the particular field is a start time field.

12. The method of claim 1, comprising including at least one correlating identifier in the aggregated network resource usage report, the correlating identifier being useable by the at least one recipient system to identify data associated with the first and second notifications.

13. The method of claim 1, comprising outputting data that is comprised in the aggregated network resource usage report and that is not comprised in at least one of the first and second usage detail reports in association with the outputting of the at least one of the first and second usage detail reports.

14. The method of claim 1, wherein said transforming comprises using one or more scripts.

15. The method of claim 1, wherein said preferential selection is based on whether the one of the first and second telecommunications event data:
originates from the first CTF or the second CTF;
is present in a list; and/or
is a most commonly reported value.

16. The method of claim 1, wherein the input interface comprises a Diameter-based Rf interface and/or an XML-based interface.

17. The method of claim 1, wherein the at least one recipient system comprises:
an audit system;
a diagnostics system;
an analytics system;

a network performance system;
a network availability system;
a usage detail report analysis system; and/or
a testing system.

18. The method of claim 1, comprising:
receiving, via the input interface, a third notification from the first CTF, the third notification being in a different format to the first notification, wherein, in response to determining that the third notification relates to the same telecommunications event, data based on the third notification is aggregated to generate the aggregated network resource usage report.

19. A computer readable storage medium storing instructions that, when executed by a processor, cause the processor to perform a method according to claim 1.

20. A network element configured to perform a method of processing data in a telecommunications network, the network element comprising:
an input interface configured to receive first and second notifications from first and second Charging Trigger Functions, CTFs, respectively in the telecommunications network, the first and second notifications relating to network resource usage in the telecommunications network, wherein the first and second notifications comprise first and second telecommunications event data respectively, wherein the first and second telecommunications event data both relate to a particular field for an aggregated network resource usage report, and wherein the first telecommunications event data is different from the second telecommunications event data;
a record handler configured to:
in response to determining that the first and second notifications relate to the same telecommunications event as each other, aggregate data based on the first and second notifications to generate the aggregated network resource usage report, wherein said aggregating comprises preferentially selecting one of the first and second telecommunications event data over the other of the first and second telecommunications event data and including said preferentially selected one of the first and second telecommunications event data in the particular field of the aggregated network resource usage report; and
use a scalable transformation function to transform the aggregated network resource usage report into a first usage detail report in a first usage detail report format and a second usage detail report in a second, different usage detail report format; and
an output interface configured to output the first and second usage detail reports to at least one recipient system.

* * * * *